US012535326B2

(12) United States Patent
Takyar et al.

(10) Patent No.: US 12,535,326 B2
(45) Date of Patent: Jan. 27, 2026

(54) INFERRING ACCURATE LOCATIONS

(71) Applicant: Uber Technologies, Inc., San Francisco, CA (US)

(72) Inventors: Mir Shahrouz Takyar, San Jose, CA (US); Andrew Yuh-Hsien Wang, San Francisco, CA (US); Nina Pakhomova, San Mateo, CA (US); Xiaowei Li, San Carlos, CA (US); Akash Parikh, San Francisco, CA (US); Bozhena Bidyuk, San Diego, CA (US)

(73) Assignee: Uber Technologies, Inc., San Francisco, CA (US)

( * ) Notice: Subject to any disclaimer, the term of this patent is extended or adjusted under 35 U.S.C. 154(b) by 157 days.

(21) Appl. No.: 17/807,293

(22) Filed: Jun. 16, 2022

(65) Prior Publication Data

US 2023/0408265 A1 Dec. 21, 2023

(51) Int. Cl.
*G01C 21/34* (2006.01)
*G01C 21/36* (2006.01)

(52) U.S. Cl.
CPC ....... *G01C 21/3415* (2013.01); *G01C 21/343* (2013.01); *G01C 21/3476* (2013.01); *G01C 21/3617* (2013.01)

(58) Field of Classification Search
CPC .............. G01C 21/3415; G01C 21/343; G01C 21/3476; G01C 21/3617
See application file for complete search history.

(56) References Cited

U.S. PATENT DOCUMENTS

| | | | | |
|---|---|---|---|---|
| 10,126,138 | B1* | 11/2018 | Farmer | G06Q 50/40 |
| 2016/0034828 | A1* | 2/2016 | Sarawgi | G06Q 10/00 |
| | | | | 705/5 |
| 2018/0058863 | A1* | 3/2018 | Meyer | G06F 3/0484 |
| 2019/0137290 | A1* | 5/2019 | Levy | B60Q 1/507 |
| 2019/0306657 | A1* | 10/2019 | Pao | H04W 4/029 |
| 2020/0208999 | A1* | 7/2020 | Tumuluru | G01C 21/3438 |
| 2021/0217311 | A1* | 7/2021 | Sullivan | G01C 21/3685 |
| 2022/0083925 | A1* | 3/2022 | Varadarajan | G06Q 50/40 |
| 2023/0119116 | A1* | 4/2023 | Xu | G06N 20/10 |
| | | | | 705/5 |
| 2023/0196272 | A1* | 6/2023 | Vellanki | G06Q 10/083 |
| | | | | 705/338 |

* cited by examiner

*Primary Examiner* — Faris S Almatrahi
*Assistant Examiner* — Dana F Artimez
(74) *Attorney, Agent, or Firm* — Schwegman Lundberg & Woessner, P.A.

(57) ABSTRACT

Systems and methods herein describe a network system for generating inferred accurate locations. The systems and methods receive a transportation trip request from a first computing device that includes a target address, access a first plurality of historical location data and a second plurality of historical data, generate clustered location data using the first plurality of historical location data and the second plurality of historical location data, select a subset of cluster locations from the clustered location data, determine an inferred accurate location address, and modify the transportation trip request by associating the inferred accurate location address with the target address.

20 Claims, 7 Drawing Sheets

INFERRING ACCURATE LOCATIONS

TECHNICAL FIELD

Embodiments herein generally relate to analyzing location data. More specifically, but not by way of limitation, embodiments herein describe a system for inferring accurate locations using historical location data.

BACKGROUND

Traditional navigation systems use Global Positioning System (GPS) data to generate navigation instructions. GPS data relies on satellite data to determine location data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Navigation instructions for a transportation service system must be accurate to ensure smooth operation of the system. A transportation service system may be responsible for sending a driver to pick-up or drop-off a passenger from location such as an apartment building or sending a driver to pick-up an item from a location such as restaurant and deliver the item to a customer. Traditional systems make navigating to specific apartment numbers or restaurants within larger buildings difficult. For example, GPS data and traditional point of interest (POI) data may not be reliable to show apartment numbers, building names, and room numbers within buildings. Therefore, there is a need to provide accurate location data for a transportation service system in these types of scenarios.

Systems and methods herein describe a network system for generating inferred accurate locations. The system receives a transportation trip request from a requester device. The transportation trip request includes a first physical address. Based on the transportation trip request, the system accesses historical location data associated with location data received by service provider devices (e.g., computing devices of drivers) and historical location data associated with location data received by requester devices (e.g., computing devices of customers or passengers). The system generates clustered location data using the historical data associated with location data of both the service provider devices and requester devices and selects a largest cluster of locations that are within a threshold distance of the first physical address. The system uses the centroid of the largest cluster to determine an inferred accurate location. Further details of the network system are described below.

Figure 1:
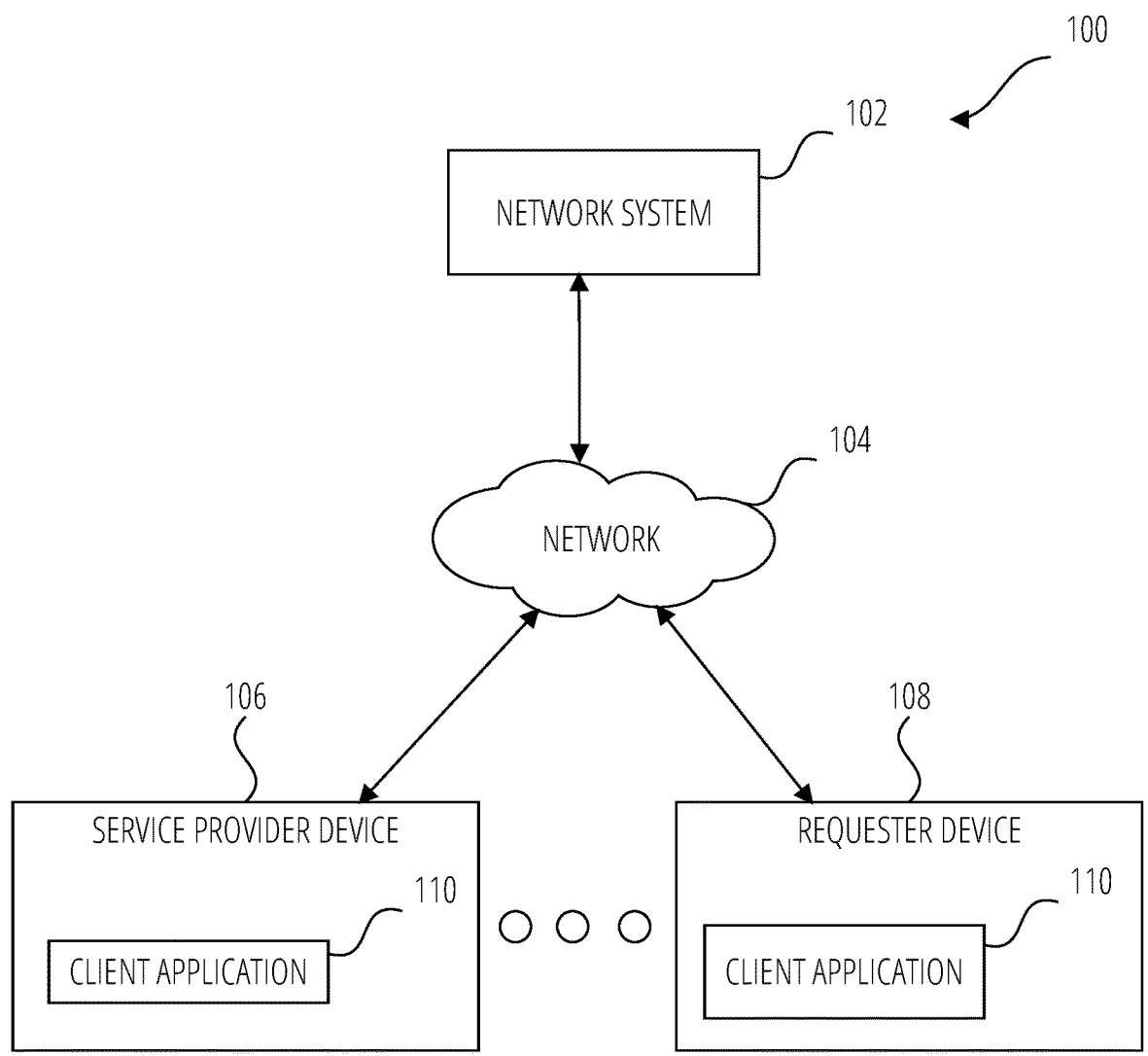
FIG. 1 is a diagram illustrating a network environment suitable for generating accurate inferred locations for a transportation service, in accordance with example embodiments.

FIG. 1 is a diagram illustrating a network environment 100 suitable for generating accurate pickup or drop-off locations, parking locations, and entrance locations (collectively referred to herein as accurate inferred locations) for a transportation service, in accordance with example embodiments. The network environment 100 includes a network system 102 communicatively coupled via a network 104 to a service provider device 106 of a driver or service provider and a requester device 108 of a user or requester (e.g., rider). In example embodiments, the network system 102 comprises components that obtain, store, and analyze data received from the service provider device 106 or the requester device 108 in order to determine accurate inferred locations. More particularly, the network system 102 generates accurate inferred locations of residential and commercial complexes based on various signals received from the service provider device 106 or the requester device 108. The network system 102 also generates the one or more potential accurate inferred locations during runtime. The components of the network system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the service provider device 106 and the requester device 108 are portable electronic devices such as smartphones, tablet devices, wearable computing devices (e.g., smartwatches), or similar devices. Alternatively, the service provider device 106 can correspond to an on-board computing system of a vehicle. The service provider device 106 and the requester device 108 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The service provider device 106 and the requester device 108 interact with the network system 102 through a client application 110 stored thereon. The client application 110 allows for exchange of information with the network system 102 via user interfaces, as well as in background. For example, the client application 110 may determine and/or provide location information of the service provider device 106 and the requester device 108 (e.g., current location in latitude and longitude), barometer readings, or signal strengths (e.g., Wi-Fi and Bluetooth signal strengths) via the network 104, for analysis and storage. In example embodiments, the location information is used by the network system 102 for generating accurate inferred locations, as will be discussed in more details below.

In example embodiments, a first user (e.g., a requester or rider) operates the requester device 108 that executes the client application 110 to communicate with the network system 102 to make a request for a transportation service such as transport or delivery service (referred to collectively as a "trip"). In example embodiments, the client application 110 presents, via user interfaces, the generated accurate inferred locations (e.g., exact entry point of a restaurant) that the first user can select as their target destination for the transportation service as part of the request.

A second user (e.g., a service provider or driver) operates the service provider device 106 to execute the client application 110 that communicates with the network system 102 to exchange information associated with providing the transportation service (e.g., to the user of the requester device 108). The client application 110 presents information via user interfaces to the second user of the service provider device 106, such as invitations to provide the transportation service, navigation instructions (e.g., a route to an accurate inferred location), and pickup and drop-off locations of people or items to be transported. The client application 110 also provides data to the network system 102 such as a current location (e.g., coordinates such as latitude and longitude), associated with the service provider device 106 or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices (e.g., service provider device 106, requester device 108) may be embodied within the network environment 100. Furthermore, some components or functions of the network environment 100 may be combined or located elsewhere in the network environment 100. For example, some of the functions of the network system 102 may be embodied within other systems or devices of the network environment 100. Additionally, some of the functions of the client devices (e.g., service provider device 106, requester device 108) may be embodied within the network system 102. While only a single network system 102 is shown, alternative embodiments may contemplate having more than one network system 102 to perform server operations discussed herein for the network system 102.

Figure 2:
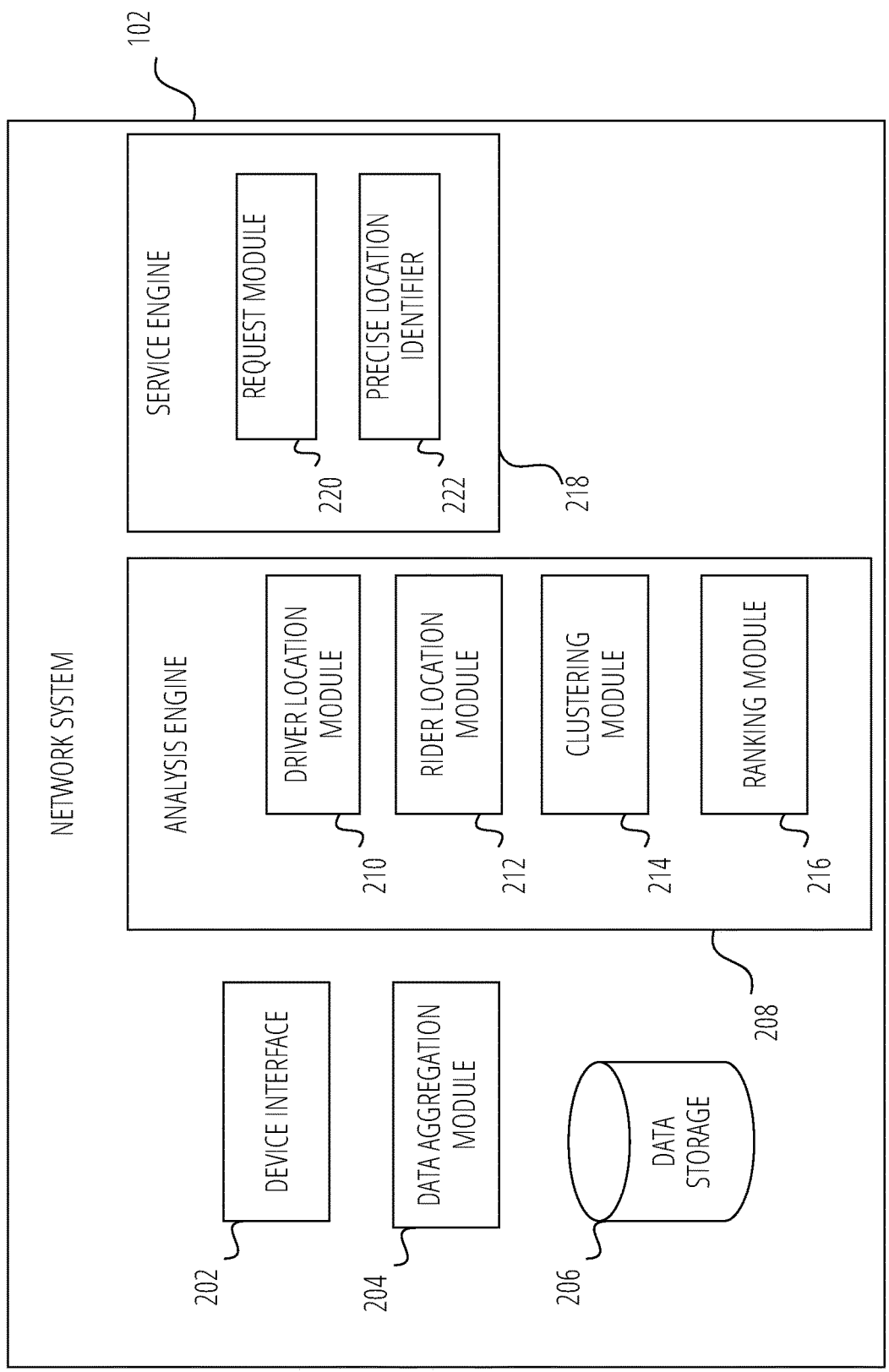
FIG. 2 is a block diagram illustrating components of the network system, according to some example embodiments.

FIG. 2 is a block diagram illustrating components of the network system 102, according to some example embodiments. In various embodiments, the network system 102 obtains and stores trip data (e.g., pickup and drop-off locations) received from the user devices (e.g., service provider device 106 and requester device 108) before, during, and after trips and analyzes the trip data to generate access points. During runtime, the network system 102 receives a target location data from a requester device 108 and uses the received data to determine one or more access points to recommend to the requester as a drop-off point for a transportation service. To enable these operations, the network system 102 comprises a device interface 202, a data aggregation module 204, a data storage 206, an analysis engine 208, and a service engine 218 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices (e.g., service provider device 106 and requester device 108) and cause presentation of one or more user interfaces provided by the network system 102 on the client devices (e.g., via the client application 110) including user interfaces to initiate a request for transportation service and select an access point. The device interface 202 also receive various trip data from the client devices and provide the trip data to the data aggregation module 204.

The data aggregation module 204 is configured to aggregate the trip data received from the client devices. The trip data can include, for example, at least one or more of: location data (e.g., latitude and longitude with timestamp), speed, times associated with each trip, or cost for the transportation service. The trip data may be received from the client device in real-time before a trip, as the user is traveling during a trip, and after a trip (e.g., providing feedback). The trip data is stored to the data storage 206 by the data aggregation module 204.

The data storage 206 is configured to store information associated with each user of the network system 102 including the aggregated trip data. The information includes various data used by the network system 102 for determining access points and providing a recommendation of one or more access points as a potential pickup or drop-off point during runtime (e.g., when the requester is making request for transportation service). In some embodiments, the data is stored in or associated with a user profile corresponding to each user and includes a history of interactions with the network system 102 (e.g., past trip data). While the data storage 206 is shown to be embodied within the network system 102, alternative embodiments can locate the data storage 206 elsewhere and be communicatively coupled to the network system 102.

The analysis engine 208 comprises components that generate accurate inferred locations based on historical data. The accurate inferred locations comprise more accurate pickup or drop-off points of a complex, venue, or location. In some examples, the accurate inferred locations comprise parking locations of a complex, venue or location. In order to generate the accurate inferred locations, the analysis engine 208 comprises a driver location module 210, a rider location module 212, a clustering module 214, and a ranking module 216.

The driver location module 210 determines locations based on collected or aggregated driver location estimates (e.g., latitude and longitude; horizontal accuracy). In example embodiments, the driver location module 210 accesses the aggregated trip data for a particular area (e.g., within a predetermined distance of a particular venue or complex) to retrieve the driver location estimates for a range up to and including a time each trip begins for a large number of historical trips. In one embodiment, the range is five minutes, although any range may be used. The driver location data may include a delivery location of an item, a drop-off location associated with a trip, a parking location, or various driver location data associated with individual trips.

The rider location module 212 manages rider location data. In example embodiments, the rider location module 212 accesses trip data associated with last known rider location estimates at the time the trip begins. In some embodiments, the rider location estimates include location estimates associated with a trip request. For example, the rider location estimates may include the location of the rider (e.g., requester device 108) at the time the transportation trip was requested (e.g., data from the request module 222 as described below).

The clustering module 214 performs clustering on the driver location data and the rider location data. In some examples, the clustering module 214 performs clustering on parking location data. The clustering module 214 utilizes a clustering algorithm that uses a distance in between every data point. The clustering module 214 clusters historical inferred accurate locations using the clustering algorithm. In one embodiment, the clustering module 214 uses DBSCAN as the clustering algorithm. However, it is to be understood that any clustering technique can be used in various embodiments, such as K-means clustering, hierarchical clustering, and so forth. The inferred accurate locations determined by the clustering module 214 are stored (e.g., in the data storage 206).

The service engine 218 is configured to manage a transportation service request during runtime. Accordingly, the service engine 218 comprises a request module 220 and an access point identifier 222. The service engine 218 may comprise other components (not shown) for managing a transportation service including assigning service providers (e.g., drivers, couriers) to a transportation service request and providing routes to a destination associated with the transportation service request.

The request module 220 manages the transportation service request. In example embodiments, the request module 220 detects or receives an indication that a user is initiating a request for a transportation service at the requester device 108. For example, the request module 220 can detect that the user opens the client application 110 and initiates a request for transportation service (e.g., selects a target location to which to travel). The request module 220 also receives a current location of the requester device 108.

The precise location identifier 222 manages generating one or more inferred accurate locations as potential pickup, drop-off or parking points for the transportation service request. In one embodiment, the precise location identifier 222 accesses historical data (e.g., from the driver location module 210 and the rider location module 212). The precise location identifier 222 then generates clustered locations for nearby inferred accurate locations for the target location (e.g., from the clustering module 214). The precise location identifier 222 selects a preferred inferred accurate location (or locations) for the pickup, drop-off, and parking point recommendations that is nearest to the target location. In some examples, the selected preferred inferred accurate location is the largest cluster from the generated clustered locations.

The request module 220 provides (e.g., via the device interface 202) the inferred accurate locations identified by the precise location identifier 222 to the client devices (e.g., service provider device 106 and requester device 108) as pickup, drop-off, or parking locations. The client application 110 may display the inferred accurate locations and specific whether the location is a pickup, drop-off or parking location as the user is requesting the transportation service. For example, the client application 110 can present the inferred accurate locations on a map, a drop-down list, or a carousel from which the user can select as the location where the trip will begin (e.g., the user will meet the service provider) or where the trip will end (e.g., where the service provider drops off the user, where the service provider delivers an item, or where the service provider parks a vehicle).

A selection of an inferred accurate location is received by the request module 220 and a transportation service is established by the request module 220. Establishing the transportation service includes assigning a service provider to the transportation service and providing navigation instructions (e.g., map, turn-by-turn instructions) to the service provider device 106 to navigate to the inferred accurate location.

Figure 3:
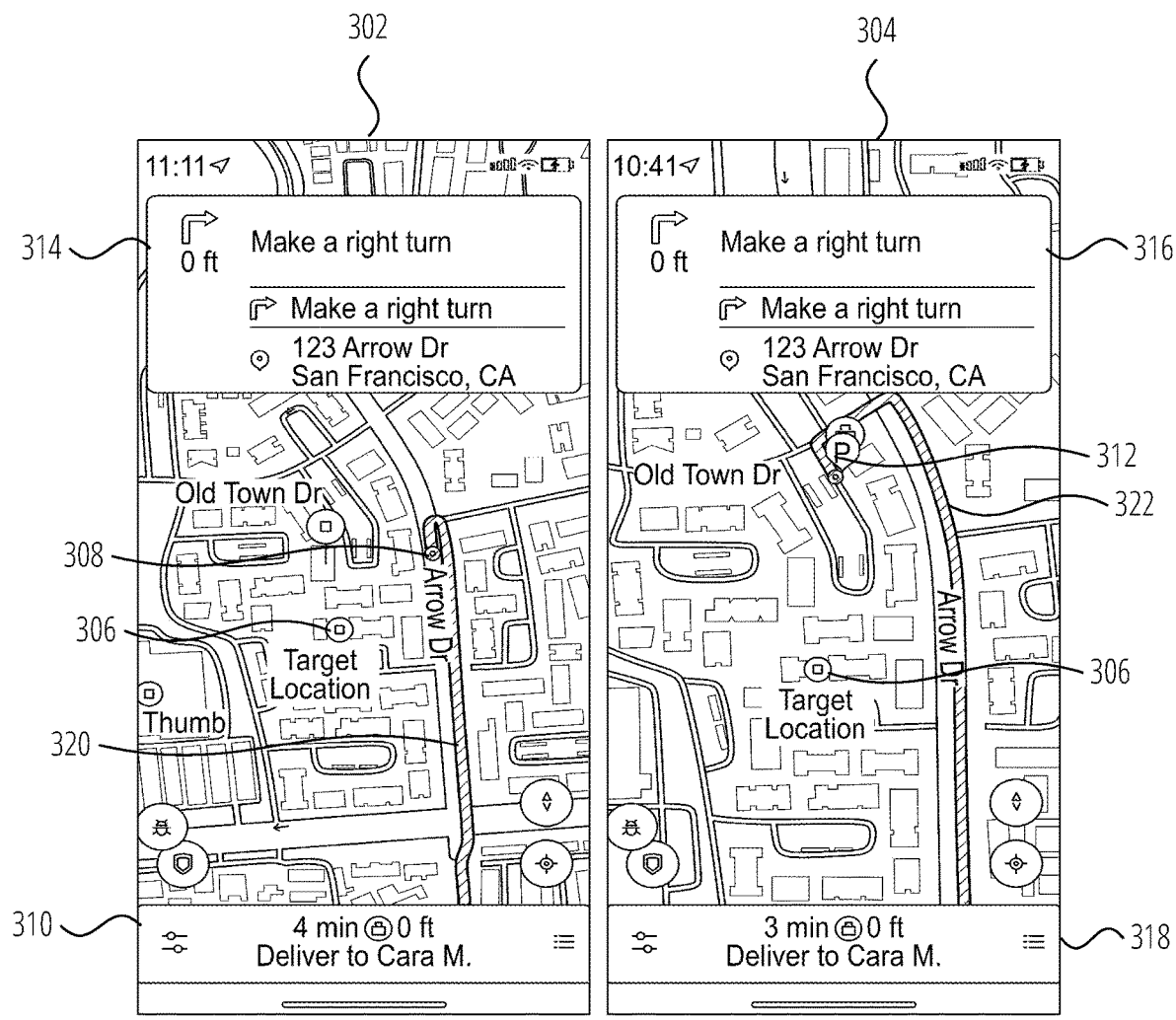
FIG. 3 is an illustration of user interfaces displayed on a service provider device according to example embodiments.

FIG. 3 is an illustration of two user interfaces 302 and 304 displayed via the device interface 202 on a service provider device 106 according to example embodiments. In the example interfaces 302 and 304 shown in FIG. 3, a user from a requester device 108 may have initiated a transportation request for a delivery item (e.g., a restaurant take-out order) to be delivered to their residence address by a user of the service provider device 106.

User interface 302 is an example display of navigation instructions to an address (e.g., 123 Arrow Dr. San Francisco, CA). Navigation instructions are shown in a first portion 314 of the interface. A real-time distance between the service provider device 106 and the target location 306 is shown in a second portion 310 of the interface. A navigation path to the navigation endpoint 308 is indicated by the patterned line 320. As shown in FIG. 3, the target location 306 is far from the navigation endpoint 308. Furthermore, the navigation endpoint 308 is in the middle of the road (Arrow Dr.) and is not a meaningful or safe location for a user of the service provider device 106 to park or exit his or her vehicle. The navigation endpoint 308 is thus not an accurate endpoint.

User interface 304 is an example display of navigation instructions to an inferred accurate location 312 as generated by the precise location identifier 222. Similar to the user interface 302, navigation instructions are shown in the first portion 316 of the interface. A real-time distance between the service provider device 106 and the target location 306 is shown in the second portion 318 of the interface. A navigation path to the inferred accurate location 312 is indicated by the patterned line 322. As shown in FIG. 3, the inferred accurate location 312 is a parking location indicated by an icon within the interface. The inferred accurate location 312 is preferred to the navigation endpoint 308 because it allows a user of the service provider device 106 to safely park their car and walk to the target location 306. In some examples, the second portion 318 is expanded to provide precise instructions on how to navigate from the inferred accurate location 312 to the target location 306. The precise instructions may also include specific delivery instructions that are preconfigured by the user of the requester device 108. For example, the second portion 318 can be expanded to show walking instructions from the parking at the accurate location 312 to the target location 306 and include instruction to leave the delivery at a specific location near the door of the apartment at the target location 306.

Figure 4:
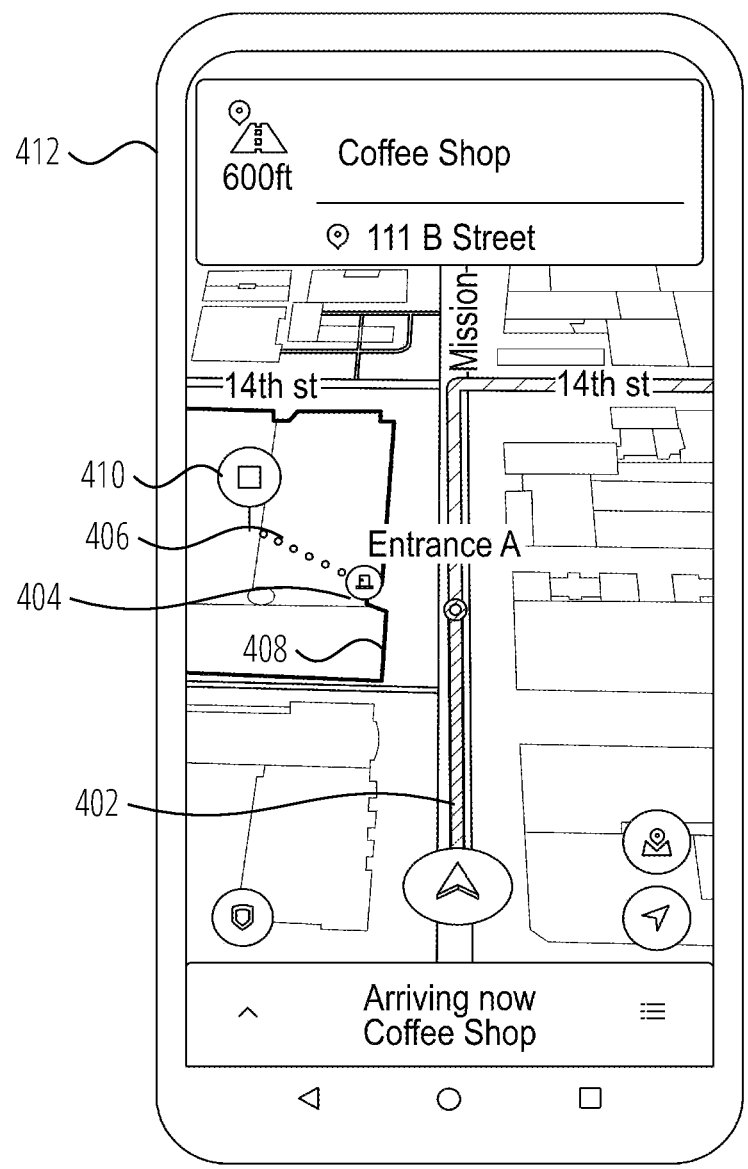
FIG. 4 is an illustration of an example user interface displayed on a service provider device during a courier pickup, according to example embodiments.

FIG. 4 is an illustration of an example user interface 412 displayed via the device interface 202 on a service provider device 106 during a courier pickup, according to example embodiments. In the example interface shown in FIG. 4, a user of the service provider device 106 is completing a transportation request that involves a courier pickup by the user (e.g., a driver) from a coffee shop. The navigation path is indicated by the patterned line 402. An inferred accurate location 404 is generated by the precise location identifier 222 and represented by an icon on the map interface. The inferred accurate location 404 is an entrance (denoted by Entrance A) to a building. In some examples, the navigation path 402 ends at the inferred accurate location 404. In some examples, the navigation path 402 includes the inferred accurate location 404 as an intermediate point that is on the way to another target destination (not pictured). The user interface includes a visual walking path 406 from the inferred accurate location 404 to the target location 410 (e.g., the coffee shop). The interface also highlights the building by darkening a boundary of the building 408 to improve the navigation experience for the user of the service provider device 106.

Figure 5:
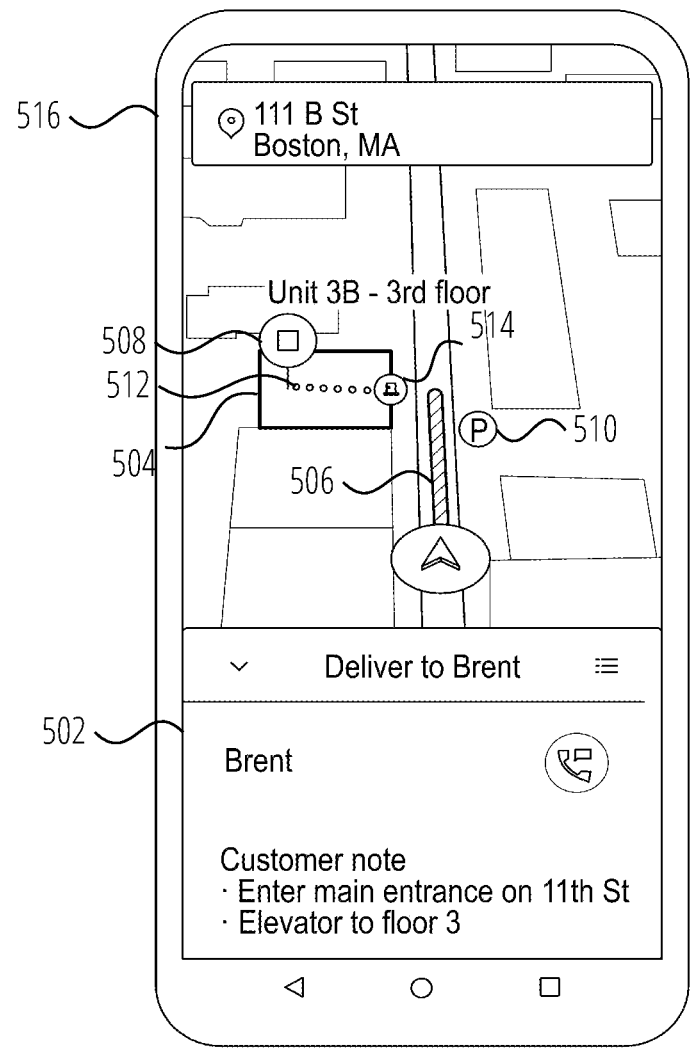
FIG. 5 s an illustration of an example user interface displayed on a service provider device during a courier drop-off, according to example embodiments.

FIG. 5 is an illustration of an example user interface 516 displayed via the device interface 202 on a service provider device 106 during a courier drop-off, according to example embodiments. In the example interface shown in FIG. 5, a user of the service provider device 106 is dropping off an order from a coffee shop to a user of a requester device 108. For example, the user interface is displayed on the service provider device 106 after the driver completes the courier pick up and is on the way to deliver the item (e.g., coffee from a coffee shop) to a customer (e.g., the user of the requester device 108). The user interface includes a navigation path 506 and an inferred accurate location 510. The inferred accurate location 510 is represented by an icon in the map interface. Specifically, in this example the inferred accurate location 510 is a parking location. The interface includes a darkened boundary of the building 504 to improve the navigation experience of the driver. The interface further includes a visual walking path 512 from the entrance of the building (denoted by icon 514) to the target location 508. In a second portion 502 of the interface, specific delivery instructions (e.g., received by the customer) are provided.

Figure 6:
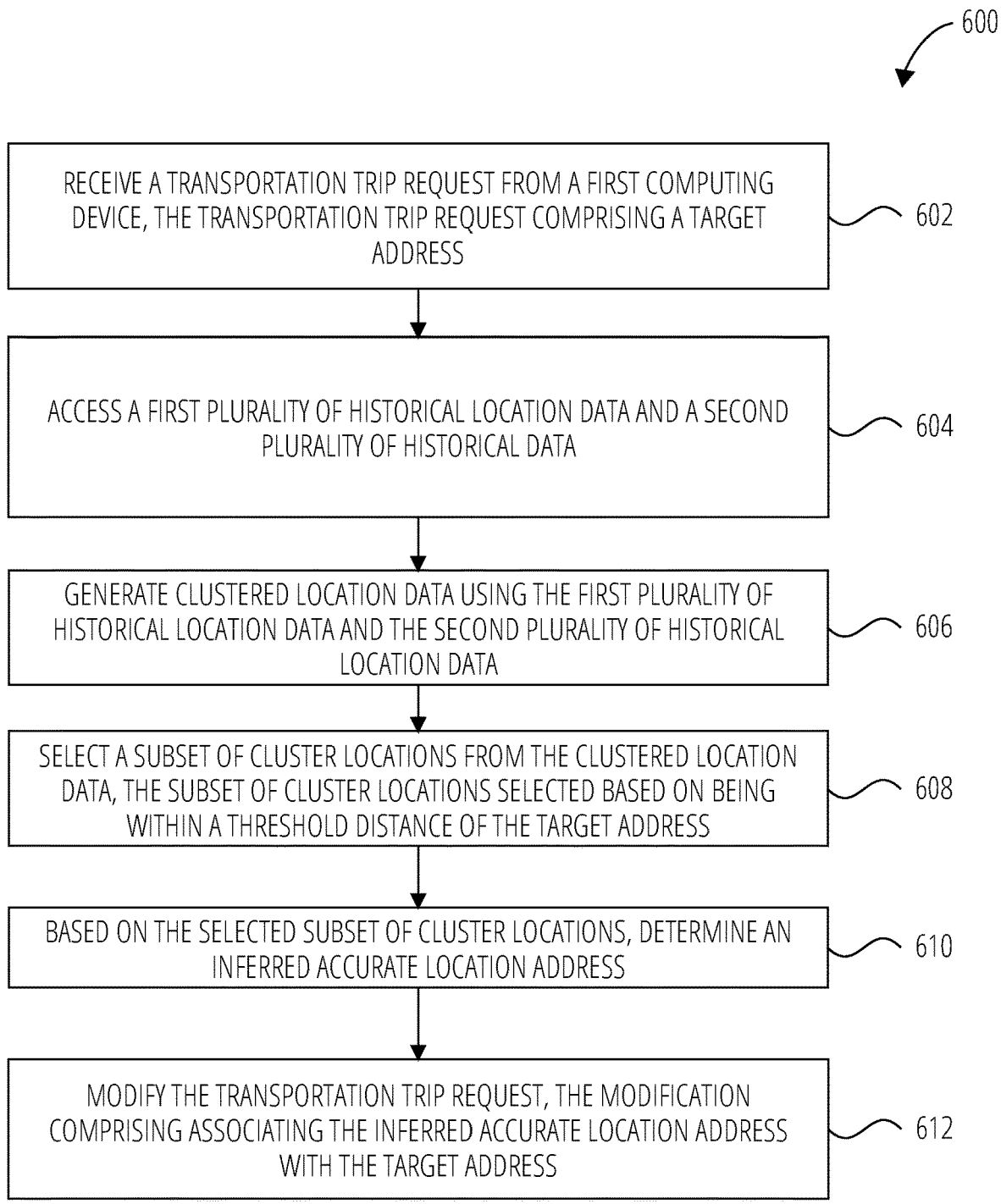
FIG. 6 is a flow diagram of a method for generating an inferred accurate location, according to example embodiments.

FIG. 6 is a flow diagram of a method 600 for generating an inferred accurate location, according to example embodiments. Although the described flow diagram can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Operations in the method 600 may be performed by the network system 102, using components described above with respect to FIG. 2. Accordingly, the method 600 is described by way of example with reference to the network system 102. However, it shall be appreciated that at least some of the operations of the method 600 may be deployed on various other hardware configurations or be performed by similar components residing elsewhere in the network environment 100. Therefore, the method 600 is not intended to be limited to the network system 102.

At operation 602, the network system 102 receives, using at least one processor, a transportation trip request from a first computing device. In one example, the first computing device is a requester device 108. The transportation trip request includes a target address, such as a physical residential address of a user of the requester device 108. The transportation trip request may further include specific pickup instructions or navigation instructions. In one example, the transportation trip request is managed by the request module 220, as explained above.

At operation 604, the network system 102 accesses a first plurality of historical location data and a second plurality of historical data based on the transportation trip request. The first plurality of historical data is associated with location data received by a plurality of service provider devices 106. For example, the first plurality of historical data is stored in one or more databases of the driver location module 210. The second plurality of historical location data is associated with location data received by a plurality of requester devices 108. The second plurality of historical data is stored in one or more databases of the rider location module 212.

At operation 606, the network system 102 generates clustered location data using the first plurality of historical location data and the second plurality of historical location data. The clustered location data is generated by the clustering module 214. In some examples, the clustered location data is generated using a density-based clustering algorithm. The clustered location data includes a first cluster associated with the first plurality of historical location data and a second cluster associated with the second plurality of historical location data.

At operation 608, the network system 102 selects a subset of cluster locations from the clustered location data. The subset of cluster locations comprises locations that are within a threshold distance of the target address. In one example, the selected subset of cluster locations is a largest cluster in the clustered location data. In another example, the selected subset of cluster locations includes multiple clusters above a threshold cluster size. In one example, the threshold distance is preconfigured by an operator of the network system 102. In some examples the threshold distance is 500 feet. In some examples, the threshold distance is determined based on urban density data associated with the target address. For example, the threshold distance may be determined using a machine learning model that is trained to analyze location data associated with the target address and generates the threshold distance based on the analysis. The machine learning model can determine the urban density data based on the location data and the threshold distance can be generated based on the urban density data.

At operation 610, the network system 102 determines an inferred accurate location address based on the selected subset of cluster locations. In some examples, the inferred accurate location address is a centroid of the selected subset of cluster locations. At operation 612, the network system 102 modifies the transportation trip request by associating the target address with the inferred accurate location address. For example, the determined inferred accurate location address may be stored in connection with the target address in one or more databases (e.g., data storage 206) of the network system 102. In some examples, an inferred accurate location address is the address of a parking location associated with the target address. In another example, the inferred accurate location address is the address of an entrance to a building that includes the target address.

In some examples, the network system 102 provides navigation instructions on a second computing device (e.g., a service provider device 106) from a current location of the second computing device to the inferred accurate location address. The navigation instructions include a display of a map interface, as described above and shown in FIGS. 3-5. In some examples, the target address is represented by a first icon on the interface and the inferred accurate location is represented by a second icon on the interface. The navigation instructions may further include navigation instructions from the inferred accurate location to the target address.

In some embodiments, the network system 102 accesses a third plurality of historical location data based on the transportation trip request. The third plurality of historical location data corresponds to parking locations associated with the target address. The third plurality of historical location data is received by the plurality of service provider devices 106. The network system 102 subsequently generates clustered location data using the first plurality of historical location data, the second plurality of historical location data, and the third plurality of historical location data. In this way the network system 102 can determine parking locations as additional inferred accurate location addresses associated with the target address. In one example, the clustered location data is generated by the clustering module 214, as described above.

In some embodiments, the network system 102 generates multiple inferred accurate locations. For example, the network system 102 determines a second inferred accurate location address based on the selected subset of cluster locations and modifies the transportation trip request by associating both the first inferred accurate location address (as described above in connection with operation 610) and the second inferred accurate location address with the target address. For example, the first inferred accurate location address may be an entrance location and the second inferred accurate location address may be a parking location, each associated with the target address (e.g., a physical address of a restaurant) such that more precise navigation instructions can be provided to a user to navigate to the parking location and then from the parking location to the entrance and then from the entrance to the target address.

Figure 7:
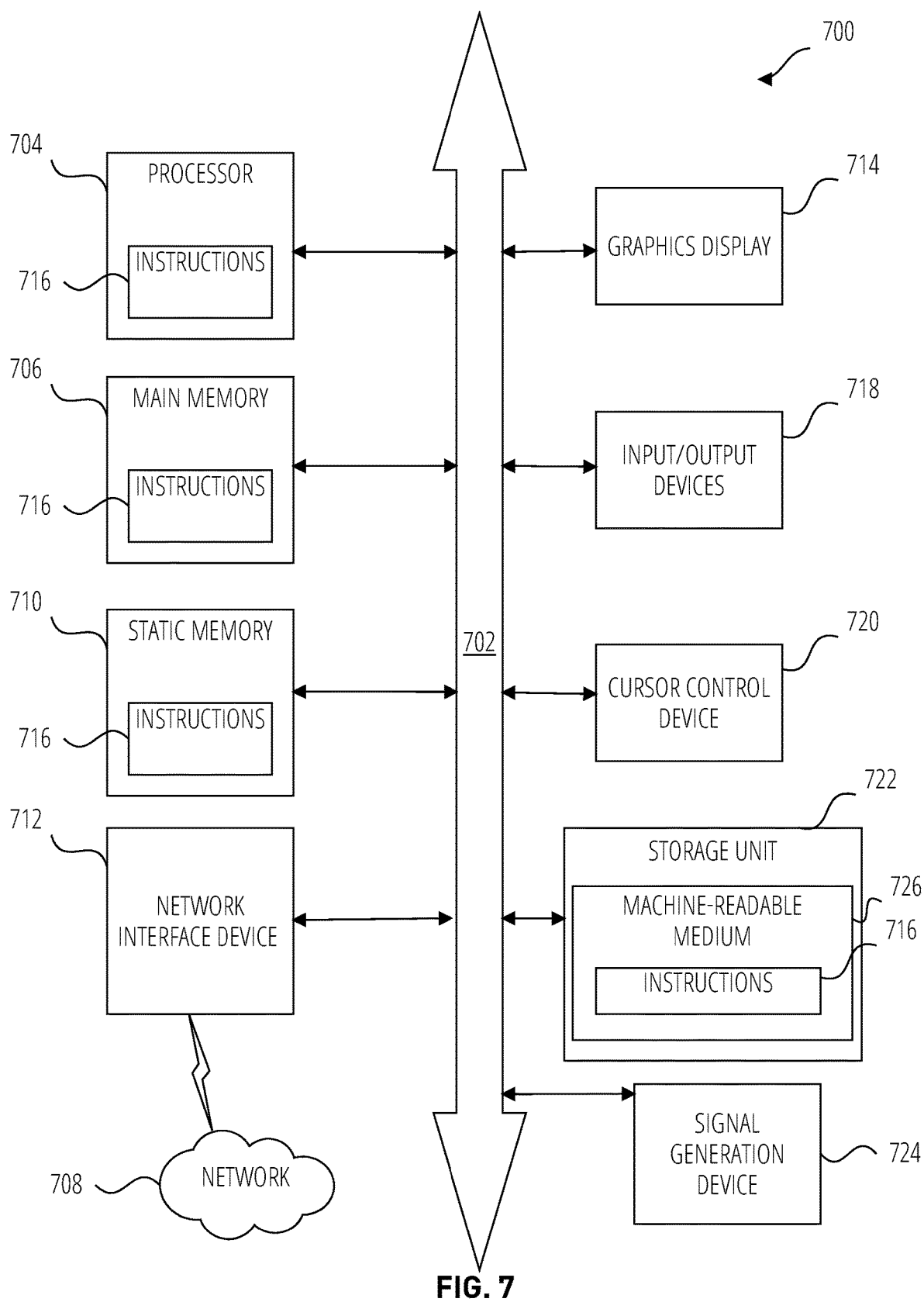
FIG. 7 shows a diagrammatic representation of a machine in the example form of a machine within which a set of instructions, for causing the machine to perform any one or more of the methodologies discussed herein, may be executed.

FIG. 7 shows a diagrammatic representation of a machine in the example form of a machine 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 700 includes a processor 704 (e.g., a central processing unit (CPU) a graphics processing unit (GPU) or both), a main memory 706 and a static memory 710 (with one or more sets of instructions 716) which communicate with each other via a bus 702. The machine 700 may further include a graphics display 714 (e.g., a liquid crystal display (LCD) or a cathode ray tube (CRT)). The machine 700 also includes an alphanumeric input device 718 (e.g., a keyboard), a cursor control device 720 (e.g., a mouse), a disk storage unit 722, a signal generation device 724 (e.g., a speaker) and a network interface device 712.

The disk storage unit 722 includes a non-transitory computer-readable medium (e.g., machine-readable medium 726) on which is stored one or more sets of instructions 716 (e.g., software) embodying any one or more of the methodologies or functions described herein. The instructions 716 may also reside, completely or at least partially, within the main memory 706 and/or within the processor 704 during execution thereof by the computer system, the main memory 706 and the processor 704 also constituting non-transitory computer-readable media.

The instructions 716 may further be transmitted or received over a network 104 via the network interface device 712.

While not illustrated, it is understood that that machine 700 can further include sensors that create data regarding a thermal state of the machine 700, an orientation of the machine 700 and a current location of the machine 700. In various embodiments, the machine 700 includes a temperature sensor, an accelerometer and/or a global position system for identifying the current location of the machine 700.

While the non-transitory computer-readable medium, machine-readable medium 826 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the subject matter described herein. The term "computer-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, by a processor, a transportation trip request from a user of a first computing device via a first graphical user interface displayed on the first computing device, the transportation trip request comprising a target address;
    retrieving, by the processor, service provider location estimates that are based on location data received from a plurality of service provider devices, and requester location estimates that are based on location data received from a plurality of requester devices;
    generating clustered location data using the service provider location estimates and the requester location estimates, wherein the clustered location data is generated using a density-based clustering algorithm;
    selecting, from the clustered location data, multiple clusters above a threshold cluster size that are located within a threshold distance of the target address, the threshold distance based on urban density data associated with the target address, wherein the urban density data is determined using a machine learning model that is trained to analyze location data associated with the target address and generates the threshold distance based on the analysis;
    determining an inferred accurate location address based on a centroid of locations represented by the selected multiple clusters;
    modifying the transportation trip request, in real-time as the transportation trip request is received to associate the inferred accurate location address with the target address, the modification comprising updating the first graphical user interface displayed on the first computing device with a selectable user interface element corresponding to the inferred accurate location;
    detecting selection, by the user of the first computing device, of the selectable user interface element corresponding to the inferred accurate location; and
    causing navigation instructions to the inferred accurate location to be displayed in a second graphical user interface displayed on a second computing device upon detecting the selection by the user, in the first graphical user interface displayed on the first computing device, of the selectable user interface element corresponding to the inferred accurate location.

2. The method of claim 1, wherein the plurality of service provider devices and the plurality of requester devices are computing devices.

3. The method of claim 1, further comprising:
    causing display on the second graphical user interface of the second computing device of navigation instructions from the inferred accurate location to the target address.

4. The method of claim 1, wherein the inferred accurate location is an entrance location associated with the target address.

5. The method of claim 4, further comprising:
    causing display of a map interface on the second computing device, the map interface comprising a first icon representing the target address and a second icon representing the inferred accurate location.

6. The method of claim 1, wherein the inferred accurate location is a parking location associated with the target address.

7. The method of claim 1, further comprising:
    based on the transportation trip request, accessing historical location data corresponding to parking locations associated with the target address; and
    generating clustered location data using the service provider location estimates, the requester location estimates, and the historical location data.

8. The method of claim 7, wherein the historical location data is received from the plurality of service provider devices.

9. The method of claim 1, wherein the clustered location data is generated using a density-based clustering algorithm.

10. The method of claim 1, wherein the inferred accurate location address is a first inferred accurate location address, the method further comprising:
    determining a second inferred accurate location address based on the selected multiple clusters; and
    modifying the transportation trip request, the modification comprising associating the first inferred accurate location address and the second inferred accurate location address with the target address.

11. The method of claim 1, wherein the service provider location estimates are for a range up to and including a time each trip begins for historical transportation services provided by each respective service provider of a plurality of service providers.

12. The method of claim 1, wherein the requester location estimates comprise a location of a requester device at a time a transportation trip was requested.

13. The method of claim 1, wherein the selectable user interface element is displayed in a drop-down list or carousel from which a user can select the selectable user interface element.

14. A computing system comprising:
    a processor; and
    a memory storing instructions that, when executed by the processor, configure the computing system to perform operations comprising:
    receiving, by the processor, a transportation trip request from a user of a first computing device via a first graphical user interface displayed on the first computing device, the transportation trip request comprising a target address;
    retrieving, by the processor, service provider location estimates that are based on location data received from a plurality of service provider devices, and requester location estimates that are based on location data received from a plurality of requester devices;

generating clustered location data using the service provider location estimates and the requester location estimates, wherein the clustered location data is generated using a density-based clustering algorithm;

selecting, from the clustered location data, multiple clusters above a threshold cluster size that are located within a threshold distance of the target address, the threshold distance based on urban density data associated with the target address, wherein the urban density data is determined using a machine learning model that is trained to analyze location data associated with the target address and generates the threshold distance based on the analysis;

determining an inferred accurate location address based on a centroid of locations represented by the selected multiple clusters;

modifying the transportation trip request, in real-time as the transportation trip request is received to associate the inferred accurate location address with the target address, the modification comprising updating the first graphical user interface displayed on the first computing device with a selectable user interface element corresponding to the inferred accurate location;

detecting selection, by the user of the first computing device, of the selectable user interface element corresponding to the inferred accurate location; and causing navigation instructions to the inferred accurate location to be displayed in a second graphical user interface displayed on a second computing device upon detecting the selection by the user, in the first graphical user interface displayed on the first computing device, of the selectable user interface element corresponding to the inferred accurate location.

15. The computing system of claim 14, wherein the plurality of service provider devices and the plurality of requester devices are computing devices.

16. The computing system of claim 14, wherein the navigation instructions include instructions from a current location of the second computing device to the inferred accurate location.

17. The computing system of claim 16, wherein the inferred accurate location is an entrance location associated with the target address.

18. The computing system of claim 17, wherein the operations further comprise:

causing display of a map interface on the second computing device, the map interface comprising a first icon representing the target address and a second icon representing the inferred accurate location.

19. The computing system of claim 16, wherein the inferred accurate location is a parking location associated with the target address.

20. A non-transitory computer-readable storage medium, the computer-readable storage medium including instructions that when executed by a computer, cause the computer to perform operations comprising:

receiving, by a processor, a transportation trip request from a user of a first computing device via a first graphical user interface displayed on the first computing device, the transportation trip request comprising a target address;

retrieving, by the processor, service provider location estimates that are based on location data received from a plurality of service provider devices, and requester location estimates that are based on location data received from a plurality of requester devices;

generating clustered location data using the service provider location estimates and the requester location estimates, wherein the clustered location data is generated using a density-based clustering algorithm;

selecting, from the clustered location data, multiple clusters above a threshold cluster size that are located within a threshold distance of the target address, the threshold distance based on urban density data associated with the target address, wherein the urban density data is determined using a machine learning model that is trained to analyze location data associated with the target address and generates the threshold distance based on the analysis;

determining an inferred accurate location address based on a centroid of locations represented by the selected multiple clusters;

modifying the transportation trip request, in real-time as the transportation trip request is received to associate the inferred accurate location address with the target address, the modification comprising updating the first graphical user interface displayed on the first computing device with a selectable user interface element corresponding to the inferred accurate location;

detecting selection, by the user of the first computing device, of the selectable user interface element corresponding to the inferred accurate location; and causing navigation instructions to the inferred accurate location to be displayed in a second graphical user interface displayed on a second computing device upon detecting the selection by the user, in the first graphical user interface displayed on the first computing device, of the selectable user interface element corresponding to the inferred accurate location.

* * * * *